Jan. 26, 1943. R. A. MABEE 2,309,521
FISH LURE AND METHOD OF MAKING SAME
Filed June 11, 1941
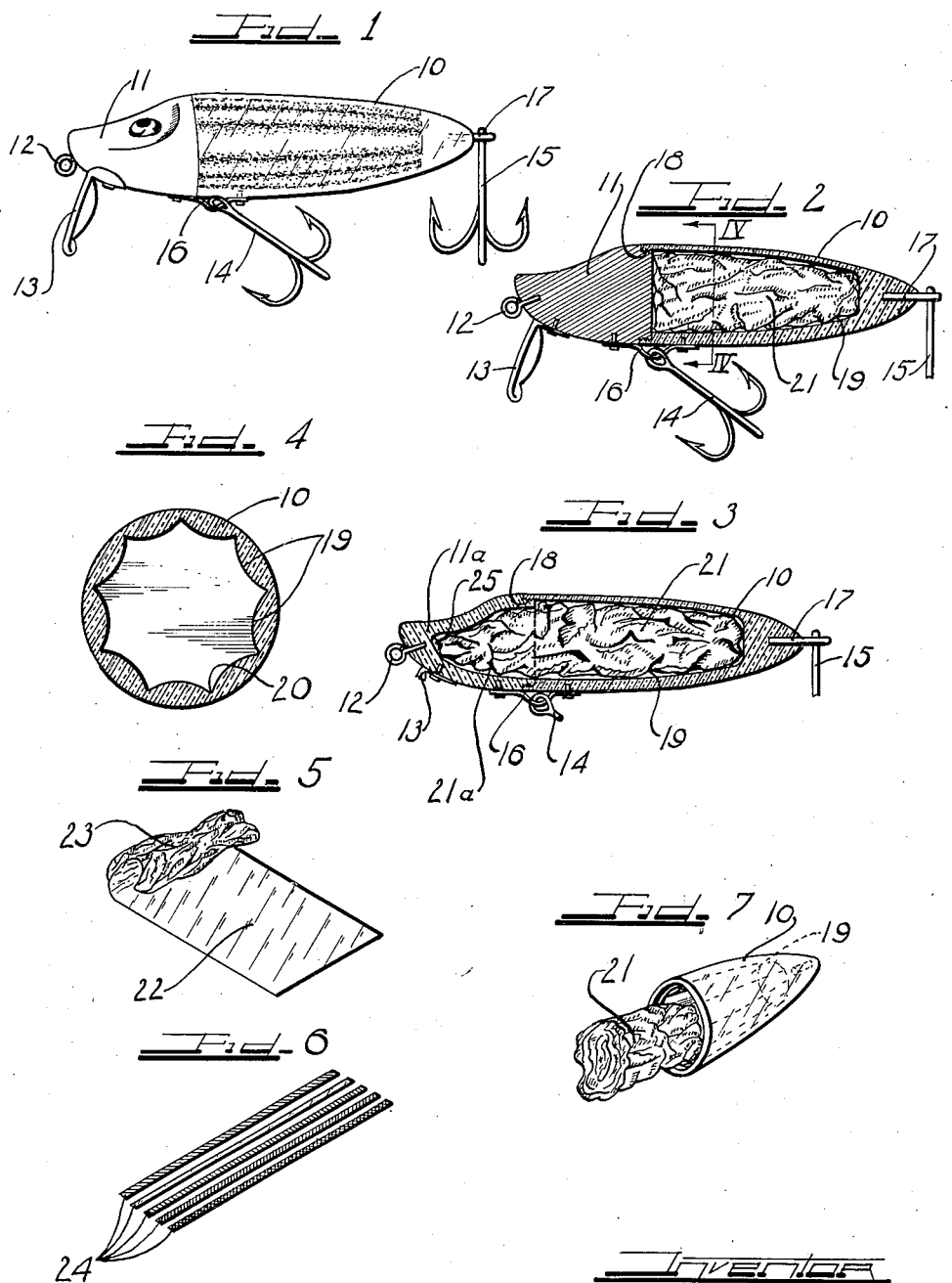
Inventor
ROBERT A. MABEE Patented Jan. 26, 1943

2,309,521

UNITED STATES PATENT OFFICE 2,309,521

FISH LURE AND METHOD OF MAKING SAME

Robert A. Mabee, Villa Park, Ill.

Application June 11, 1941, Serial No. 397,533

16 Claims. (Cl. 43—46)

This invention relates to improvements in a fish lure and a method of making the same, the lure being of the character of a plug type bait highly desirable for use in ocean surf casting as well as casting in inland lakes, rivers, streams and springs, although the invention may have other uses as will be apparent to one skilled in the art.

I am aware that in the past many and various types of fish lures have been provided, and a great number of these have been in the form of plug baits for casting. In the case of the latter, many and various types of decorative outer surfaces have been provided, as well as movable devices contained in a substantially transparent hollow body, all in an endeavor to provide some sparkling or scintillating appearance in simulation of the scales of a living fish or otherwise, for the purpose of sufficiently attracting a fish to have it strike the bait. However, in the case of these formerly known baits, many of them were objectionably expensive, some of them were too fragile to withstand repeated but ordinary usage, many were totally unnatural in appearance, and in no instance of which I am aware did any of them give a truly sparkling and scintillating appearance, which was protected and durable, in simulation of a living fish throughout the body portion of the bait, nor could any of these formerly known devices be changed in character and appearance at will by the user angler.

With the foregoing in mind, it is an important object of the present invention to provide a fish bait or lure of the plug type which presents a scintillating sparkling appearance in simulation of the scales on a living fish, and is so designed as to protect the appearance for indefinite period of time against the roughest character of use a bait will receive in performance of its duties.

Another object of the invention is the provision of a fish bait of the plug type having a hollow substantially transparent portion containing a material arranged to provide a myriad of reflecting surfaces visible through the transparent portion and presenting a highly attractive appearance when the bait is in action in the water.

Still another feature of the present invention resides in the provision of a plug type fish bait having a hollow substantially transparent portion filled with a material capable of providing numerous light reflecting surfaces as well as presenting a highly attractive added effect by virtue of the translucency of the material.

It is also an object of this invention to provide a fish bait having a hollow substantially transparent portion filled with matted or crumpled Cellophane or some equivalently economical material of any desired color or colors, such material when crumpled or matted presenting numerous light reflecting surfaces while remaining translucent.

It is a further feature of this invention to provide a fish lure including a hollow transparent portion containing a removable cartridge of some economical light reflecting material, whereby the color and appearance of the bait may be changed and varied at will by the angler user.

It is also an object of this invention to provide a new and novel method of making a fish lure.

While some of the more salient features, characteristics and advantages of the present invention have been above pointed out, others will become apparent from the following disclosures, taken in conjunction with the accompanying drawing, in which—

Figure 1 is a side elevational view of a fish lure embodying principles of the present invention;

Figure 2 is a central vertical sectional view of the bait seen in Fig. 1;

Figure 3 is a central vertical sectional view, similar in character to Fig. 2, but illustrating a modified form of fish lure embodying principles of this invention;

Figure 4 is a transverse vertical sectional view through the body portion only of either of the baits seen in Figs. 2 and 3, taken substantially as indicated by the line IV—IV of Fig. 2;

Figure 5 is a projectional view of a sheet or film of material, indicating how a cartridge may be made of such material for insertion in the hollow portion of either of the baits seen in Figs. 2 and 3;

Figure 6 is a projectional view of other material in shredded or ribbon form from which a cartridge may be made; and Figure 7 is a partially exploded view indicating how a cartridge may be inserted in a hollow portion of the bait.

As shown on the drawing:

At the outset, it will be understood that a fish lure embodying principles of the present invention may be made in any of many and various shapes, sizes, and styles, equipped with suitable means to provide whatever particular form of action in the water may be desired, and provided with substantially any desired form of hook assembly or arrangement.

In the illustrated embodiment of this invention seen in Figs. 1 and 2, there is shown a plug type bait including a body portion 10 and a head portion 11. The head portion may be equipped with a suitable ring 12 for connection to a line or leader, and a spoon member 13 or other device for providing a particular action of the bait in the water. Either the head portion, the body portion, or both, may be provided with any suitable hook assembly or arrangement, and in this instance I have illustrated two sets of treble hooks 14 and 15 attached to the bait by a stirrup 16 and eye screw 17, respectively.

It will be understood that the body portion 10 and the head portion 11 may be substantially permanently attached together if so desired, but for the purpose of better presenting all features of the instant invention, I have chosen to illustrate these portions as separable, the portions being held firmly united when in use by a suitable arrangement such as the threaded connection designated by numeral 18. In this instance, the head 11 is shown opaque, while the body 10 is preferably substantially transparent. Both the head and body may be made of any suitable or desirable material, molded plastic being highly satisfactory. If that material is used, the head may be molded of opaque plastic, while the body 10 is preferably of uncolored substantially transparent plastic.

As seen more clearly in Figs. 2 and 4, the body portion 10 is hollow, the hollow being in the nature of an elongated recess, there being sufficient solid material at the rear end of the body to accommodate the eye screw 17. With reference particularly to Fig. 4, it will be seen that the body is preferably molded so as to provide numerous longitudinally extending internal ribs 19 with a longitudinally extending recess 20 between each pair of adjacent ribs. The outside surface of the body 10 is actually smooth but the provision of the internal ribs makes the body appear to have a longitudinally fluted exterior surface. This, of course, adds to the overall luring qualities of the bait.

The main feature of the present invention resides in giving the bait a scintillating sparkling appearance which may in effect simulate the flashing appearance of a fish swimming through the water. This appearance is provided by inserting a cartridge or conglomerate mass of material arranged to provide a myriad of light reflecting surfaces in the hollow body 10. This cartridge or mass is indicated by numeral 21 in Figs. 2, 3 and 7 of the drawing, and may be made of various materials, such as metal foils, mica, certain types of papers, all of which may be used in either sheet or shredded form, metallic or nonmetallic ribbons, etc. I have found that a very satisfactory material for this purpose is Cellophane which may be initially in either sheet form or in shredded form. In Fig. 5 I have illustrated a sheet 22 of Cellophane which may be in any desired color, and also illustrated how this sheet may be crumpled or crushed into an irregular mass, as indicated at 23 in forming a cartridge.

In Fig. 6 I have illustrated some strips 24 of shredded Cellophane cross hatched to indicate that different colors may be used. These strips or ribbons of shredded Cellophane may be crushed into a heterogeneous mass to form one of the cartridges 21. It is not necessary, however, that the cartridge be in one single piece of material, whether it be made from sheet material or shredded material. It may be desirable to have one portion of the cartridge in one color, and another portion in another color, and it is a simple expedient to use two separate pieces or bunches of material and insert them so as to reasonably define spaced color bands such, for example, as a relatively long white or yellow portion in the rear part of the bait, and a relatively short red portion near the head of the bait. A very attractive bait may also be made by taking shredded Cellophane of several different colors, and mixing them heterogeneously throughout the full length of the cartridge.

Whichever form of material, sheet or shredded, is used it is simply necessary to crush the material haphazardly to form an irregular or conglomerate mass, and where the term conglomerate is used herein and in the appended claims, the same is to be construed as including an irregularly crumpled cartridge, even though only one material or one kind of material may go to form that cartridge.

It will be appreciated that when a material such as Cellophane, glassine paper, or the like is used, great economy results. However, economy is not the only feature provided by materials of this character, as distinguished from materials of the character of metallic foils or ribbons or other opaque materials. Cellophane and glassine papers and the like are substantially transparent, and when crumpled as above described, a myriad of light reflecting surfaces are provided, and while certain spots of the cartridge may be in effect opaque, nevertheless there is a general translucency throughout the cartridge which adds materially to the attractiveness and luring qualities of the bait.

In Fig. 3 I have illustrated a slightly modified form of construction, wherein a head 11a is also made substantially transparent, although the head has the same general construction and contour as the head 11, except that it is provided with an interior hollow 25 to receive a cartridge portion 21a the same as the body 10 receives the cartridge portion 21. Owing to the removable connection between the head 11a and the body 10, which is the same as the removable connection between the head 11 and the body 10, an angler may vary the character of his bait at will by the simple expediency of removing the head, taking out the cartridge from the body or from the body and from the head, and inserting another cartridge of a different color. For example, with the bait shown in Fig. 3 it is a simple expedient requiring only a few moments' time to transform the bait from a red head with white body to a black head with yellow body. It is only necessary for the angler to carry with him a few sheets of filling material, a few bundles of shredded filling material, all of different colors, or he may even carry initially prepared cartridges. If he has a sheet or shredded material it is a simple expedient to crumple it into the form of a cartridge and stuff it in the bait. In like manner, variations in color of the body 10 of the bait illustrated in Fig. 2 may be provided at will by the angler.

My novel method of making a fish lure is believed to be sufficiently apparent from the foregoing as to warrant only a short summary herein. It will be appreciated it is a simple expedient to provide a hollow substantially transparent bait portion and then form a conglomerate mass of material arranged to provide numerous light reflecting surfaces, and stuff it into the hollow transparent portion.

From the foregoing, it is apparent that I have provided a novel and attractive fish bait possessing high luring qualities. The bait is exceedingly simple in construction, and substantially indestructible in ordinary usage. To afford a flashing scintillating appearance of a swimming fish, coupled with translucency if so desired, only the most economical material need be used, and these materials are effectively protected from destruction by the construction of the bait. An added feature of the bait resides in the fact that an angler may carry a few sheets or bunches of lightweight materials of different colors and change the character of his bait by a simple operation whenever he desires to do so.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A fish lure including a hollow substantially transparent portion, and a translucent conglomerate mass of stable sheet material in said hollow portion.

2. A fish lure including a hollow substantially transparent portion, and a conglomerate mass of stable light reflecting sheet material in said portion.

3. A fish lure including a hollow substantially transparent portion, and a conglomerate mass of bright crumpled sheet material in said portion to provide a myriad of light reflecting surfaces visible through the wall of said portion.

4. A fish lure including a hollow substantially transparent portion, and a heterogeneous mass of crumped material of different colors in said portion affording a myriad of light reflecting surfaces.

5. A fish lure including a hollow substantially transparent portion, and a mass of light reflecting means in said portion to provide reflecting surfaces in simulation of fish scales visible through the wall of said portion.

6. A fish lure including a hollow substantially transparent portion, and a mass of crumpled Cellophane in said portion.

7. A fish lure including a hollow substantially transparent portion, and a mass of shredded Cellophane in said portion.

8. A fish lure including a hollow substantially transparent portion, and a heterogeneous mass of shredded Cellophane of different colors in said portion.

9. A fish lure in the form of a plug made up of separable parts at least one of which is hollow and substantially transparent, and a removable cartridge of stable crumped material permanently capable of providing numerous light reflecting surfaces in the hollow part.

10. A fish lure in the form of a plug including a hollow substantially transparent hook-bearing portion containing bright crumpled material providing numerous light reflecting surfaces.

11. A fish lure in the form of a plug, including a substantially transparent body portion, a substantially transparent head portion connected to the body portion, and a mass of material arranged to provide numerous light reflecting surfaces inserted in both of said body and head portions.

12. A fish lure in the form of a plug having a hollow substantially transparent portion, and matted substantially transparent Cellophane substantially filling said hollow portion in a manner to provide a translucent mass having numerous light reflecting surfaces visible through said portion.

13. The method of making a fish lure, including the steps of providing a hollow substantially transparent portion, forming a mass of bright material arranged to provide numerous light reflecting surfaces, and stuffing the mass into said hollow portion.

14. The method of making a fish lure, including the steps of molding a hollow substantially transparent portion, and then pressing shredded bright material into said hollow portion in a manner to substantially fill the hollow portion with a heterogeneous mass having numerous light reflecting surfaces.

15. The method of making a fish lure, including the steps of providing a hollow substantially transparent portion, forming a mass of crumpled Cellophane, and stuffing the mass in said hollow portion.

16. A fish lure including a hollow transparent portion, and a removable cartridge of paper-like material arranged to provide numerous light reflecting surfaces disposed in said hollow portion.

ROBERT A. MABEE.